United States Patent
Hardebeck et al.

(10) Patent No.: US 9,832,988 B2
(45) Date of Patent: *Dec. 5, 2017

(54) ANIMATED DECOY SPREADER

(71) Applicants: Benjamin Hardebeck, Black Diamond, WA (US); Tom Hardebeck, Black Diamond, WA (US)

(72) Inventors: Benjamin Hardebeck, Black Diamond, WA (US); Tom Hardebeck, Black Diamond, WA (US)

(73) Assignee: Motion Ducks, LLC, Black Diamond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/180,041

(22) Filed: Jun. 12, 2016

(65) Prior Publication Data

US 2016/0286789 A1    Oct. 6, 2016

Related U.S. Application Data

(63) Continuation of application No. 14/634,343, filed on Feb. 27, 2015, now Pat. No. 9,167,807, and a
(Continued)

(51) Int. Cl.
*A01M 31/06* (2006.01)
*A01M 31/00* (2006.01)
(Continued)

(52) U.S. Cl.
CPC .......... *A01M 31/006* (2013.01); *A01M 31/00* (2013.01); *A01M 31/06* (2013.01);
(Continued)

(58) Field of Classification Search
CPC ...... A01M 31/00; A01M 31/06; A01M 31/08; A01M 29/06; A01M 99/00; F16F 1/3605
(Continued)

(56) References Cited

U.S. PATENT DOCUMENTS

| | | | | |
|---|---|---|---|---|
| 970,003 | A | * | 9/1910 | Wethall ................. A01M 31/06 43/3 |
| 5,074,071 | A | * | 12/1991 | Dunne ................... A01M 31/06 43/2 |

(Continued)

*Primary Examiner* — Patrick J Maestri
(74) *Attorney, Agent, or Firm* — Michelle E. Carey; Telekta Law, P.S.

(57) ABSTRACT

A device for spreading fowl decoys on the surface of a body of water. A hub sits below the surface is removably coupleable with up to four arm arrangements. Arm arrangements are jointed, allowing hub and arm arrangements to sit below the surface of the water while decoys float on surface. Hub is connected to an anchor on the bottom of the body of water, and can be displaced horizontally with a pull cord. Cords in the arm arrangements allow for near-random motion of attached decoys, simulating a swimming motion of fowl. Hub can be displaced vertically with a pull cord, causing the decoys to dip head first into the water, simulating a feeding motion of water fowl. Hubs can be combined by coupling arm arrangements from each hub. When displaced horizontally in the water, hubs not attached to the pull cord move semi-randomly, creating more random motion in decoys.

16 Claims, 9 Drawing Sheets

Related U.S. Application Data continuation of application No. 14/807,839, filed on Jul. 23, 2015, now Pat. No. 9,366,381.

(51) Int. Cl.
*F16F 1/36* (2006.01)
*F16M 13/00* (2006.01)
*F16M 11/06* (2006.01)
*F16M 13/02* (2006.01)

(52) U.S. Cl.
CPC ........... *F16F 1/3605* (2013.01); *F16M 11/06* (2013.01); *F16M 13/00* (2013.01); *F16M 13/02* (2013.01); *A01M 2200/00* (2013.01)

(58) Field of Classification Search
USPC .......................................................... 43/2, 3
See application file for complete search history.

(56) References Cited

U.S. PATENT DOCUMENTS

| | | | |
|---|---|---|---|
| 7,788,840 B2 * | 9/2010 | Wyant | A01M 31/06 43/2 |
| 2009/0094877 A1 * | 4/2009 | Smith | A01M 31/06 43/3 |
| 2012/0324777 A1 * | 12/2012 | Smith | A01M 31/06 43/2 |

* cited by examiner

ANIMATED DECOY SPREADER

PRIORITY CLAIM

This application claims the benefit of U.S. provisional patent application No. 62/023,792, filed Jul. 11, 2014, U.S. patent application Ser. No. 14/634,343, filed Feb. 27, 2015, and U.S. patent application Ser. No. 14/807,839, filed Jul. 23, 2015. The foregoing applications are incorporated in their entirety as if fully set forth herein.

FIELD OF THE INVENTION

This invention relates generally to hunting decoys, and more specifically, to animated decoy formations for water fowl.

BACKGROUND

Hunters of water fowl have long sought methods by which they can lure ducks, geese, and other water birds closer to the hunter. Decoys have been implemented to give water fowl a sense of security in drawing near a body of water. The more realistic the decoy appears, the more effective it is. Decoys exist in embodiments that range from completely stationary to "flying", but it is difficult to accurately simulate natural movements of fowl. The decoys that currently exist are stationary, are subject to limited or unnatural motion, or move with the use of complicated mechanisms and machinery, sometimes relying on electrical power, none of which are ideal for a task that necessarily takes place in water. The present invention provides a simple, water-compatible decoy system that allows the hunter to simulate the natural motion of water fowl with a plurality of decoys.

SUMMARY

This invention relates generally to hunting decoys, and more specifically, to animated decoy formations for water fowl.

One exemplary embodiment of the decoy spreader may include: a hub including at least one aperture; an arm arrangement, including a tubular member with a far end and a hub end, the hub end removably received by the aperture of the hub, and the tubular member being hollow from the far end to the hub end; and an elastic cable disposed through the hollow of the tubular member and the aperture of the hub. In a further embodiment, the arm arrangement may include a cylinder having a shorter length than the tubular member and being hollow from a first end of the cylinder to a second end of the cylinder, wherein the elastic cord is disposed through the hollow of the cylinder, the hollow of the tubular member, and the aperture of the hub. In another embodiment, the arm arrangement may include a third hollow segment having substantially the same length as the tubular member and located between the tubular member and the cylinder, wherein the elastic cord is disposed through the hollow of the cylinder, the hollow of the third segment, the hollow of the tubular member, and the aperture of the hub. In an alternate embodiment, the arm arrangement may include a third hollow segment having substantially the same length as the cylinder and located between the tubular member and the cylinder, wherein the elastic cord is disposed through the hollow of the cylinder, the hollow of the third segment, the hollow of the tubular member, and the aperture of the hub. In another embodiment, the third hollow segment may be of a length substantially different from the lengths of the tubular member and the cylinder, wherein the elastic cord is disposed through the hollow of the cylinder, the hollow of the third segment, the hollow of the tubular member, and the aperture of the hub.

In some embodiments, the arm arrangement may further include a connecting member located at the far end of the arm arrangement and capable of coupling with a decoy. In a further embodiment, the connecting member may be comprised of a wire, at one end of which is a catch into which the other end is inserted to form a closed loop, and an eyelet, wherein the elastic cord is disposed through the eyelet.

In another exemplary embodiment, the hub of the decoy spreader may be comprised of a disk, including a top surface, a bottom surface, and an edge defining a cylindrical shape, wherein the edge includes at least one aperture. In another embodiment, the hub may be comprised of a channel with a first end on a first side of the hub and a second end on a second side of the hub, wherein the first end is a first aperture and the second end is a second aperture. In further exemplary embodiment, the decoy spreader may be comprised of a hub including a first channel and a second channel; a first arm arrangement, a second arm arrangement, a third arm arrangement, and a fourth arm arrangement; a first elastic cable disposed through the hollow of the first arm arrangement, the first channel, and the hollow of the second arm arrangement; and a second elastic cable disposed through the hollow of the third arm arrangement, the second channel, and the hollow of the fourth arm arrangement.

In some embodiments, the decoy spreader may include an anchor and a cord coupling the anchor with the hub. In a further embodiment, the decoy spreader may include an inelastic anchor cord disposed through a loop on the anchor and through a loop on a surface of the hub. In another embodiment, the cord coupling the anchor with the hub may be further disposed through a handle, wherein the handle is retained by the hunter such that the hunter can move the hub by tugging on the cord. In another embodiment, the cord coupling the anchor with the hub comprises may include an elastic anchor cord disposed through a loop on the anchor and through a loop on a surface of the hub. In a further embodiment, the decoy spreader may include an inelastic pull cord disposed through the loop on the surface of the hub and a handle.

In another exemplary embodiment, the decoy spreader may be comprised of a hub including an aperture; a first arm arrangement, including a hollow tubular member with a far end and a hub end, the hub end removably received by the aperture of the hub; and a second arm arrangement, the second arm arrangement configured like the first arm arrangement; an elastic cable disposed through the hollow of the first arm arrangement, the aperture of the hub, and the hollow of the second arm arrangement. In a further embodiment, the decoy spreader may include: a hub including a first aperture and a second aperture; a first arm arrangement, a second arm arrangement, a third arm arrangement, and a fourth arm arrangement; a first elastic cable disposed through the hollow of the first arm arrangement, the first aperture, and the hollow of the second arm arrangement; and a second elastic cable disposed through the hollow of the third arm arrangement, the second aperture, and the hollow of the fourth arm arrangement. In another embodiment, the decoy spreader may include: a first connecting member located at the far end of the first arm arrangement and coupled with the first elastic cable; a second connecting member located at the far end of the second arm arrangement and coupled with the first elastic cable; a third connecting member located at the far end of the third arm arrangement and coupled with the second elastic cable; and a fourth connecting member located at the far end of the fourth arm arrangement and coupled with the second elastic cable.

In another exemplary embodiment, the decoy spreader may be comprised of: a first hub and a second hub, each including at least one aperture; a first arm arrangement coupled with the first hub, including a hollow tubular member with a far end and a hub end, the hub end removably received by the aperture of the hub; a second arm arrangement configured like the first arm arrangement and coupled with the second hub; a first elastic cable disposed through the hollow of the first arm arrangement and the aperture of the first hub; a second elastic cable disposed through the hollow of the second arm arrangement and the aperture of the second hub; and a connector bar coupled with the far end of the first arm arrangement and the far end of the second arm arrangement.

In another embodiment, the hub may be comprised of a channel with a first end on a first side of the hub and a second end on a second side of the hub, wherein the first end is a first aperture and the second end is a second aperture. In a further embodiment, the decoy spreader may be comprised of: a first hub including a first channel; a second hub including a second channel; a first arm arrangement, a second arm arrangement, a third arm arrangement, and a fourth arm arrangement; a first elastic cable disposed through the hollow of the first arm arrangement, the first channel, and the hollow of the second arm arrangement; a second elastic cable, the second elastic cable disposed through the hollow of the third arm arrangement, the second channel, and the hollow of the fourth arm arrangement a connector bar, wherein the connector bar is coupled with the far end of the first arm arrangement and the far end of the third arm arrangement; and wherein the far end of the second arm arrangement is coupled directly with the far end of the fourth arm arrangement. In another embodiment, the decoy spreader may be comprised of: a first hub including a first channel and a second channel; a second hub including a third channel and a fourth channel; a first arm arrangement, a second arm arrangement, a third arm arrangement, a fourth arm arrangement, a fifth arm arrangement, a sixth arm arrangement, a seventh arm arrangement, and an eighth arm arrangement; a first elastic cable disposed through the hollow of the first arm arrangement, the first channel, and the hollow of the second arm arrangement; a second elastic cable disposed through the hollow of the third arm arrangement, the second channel, and the hollow of the fourth arm arrangement; a third elastic cable disposed through the hollow of the fifth arm arrangement, the third channel, and the hollow of the sixth arm arrangement; a fourth elastic cable disposed through the hollow of the seventh arm arrangement, the fourth channel, and the hollow of the eighth arm arrangement; a connector bar coupled with the far end of the fourth arm arrangement and the far end of the seventh arm arrangement; and wherein the far end of the first arm arrangement is coupled directly with the far end of the sixth arm arrangement.

In addition to the foregoing, various other systems and/or product embodiments are set forth and described in the teachings such as the text (e.g., claims, drawings and/or the detailed description) and/or drawings of the present disclosure.

The foregoing is a summary and thus contains, by necessity, simplifications, generalizations and omissions of detail; consequently, those skilled in the art will appreciate that the summary is illustrative only and is NOT intended to be in any way limiting. Other aspects, embodiments, features and advantages of the device and/or processes and/or other subject matter described herein will become apparent in the teachings set forth herein.

BRIEF DESCRIPTION OF THE DRAWINGS

Certain embodiments of the present invention are described in detail below with reference to the following drawings.

DETAILED DESCRIPTION

Figure 1:
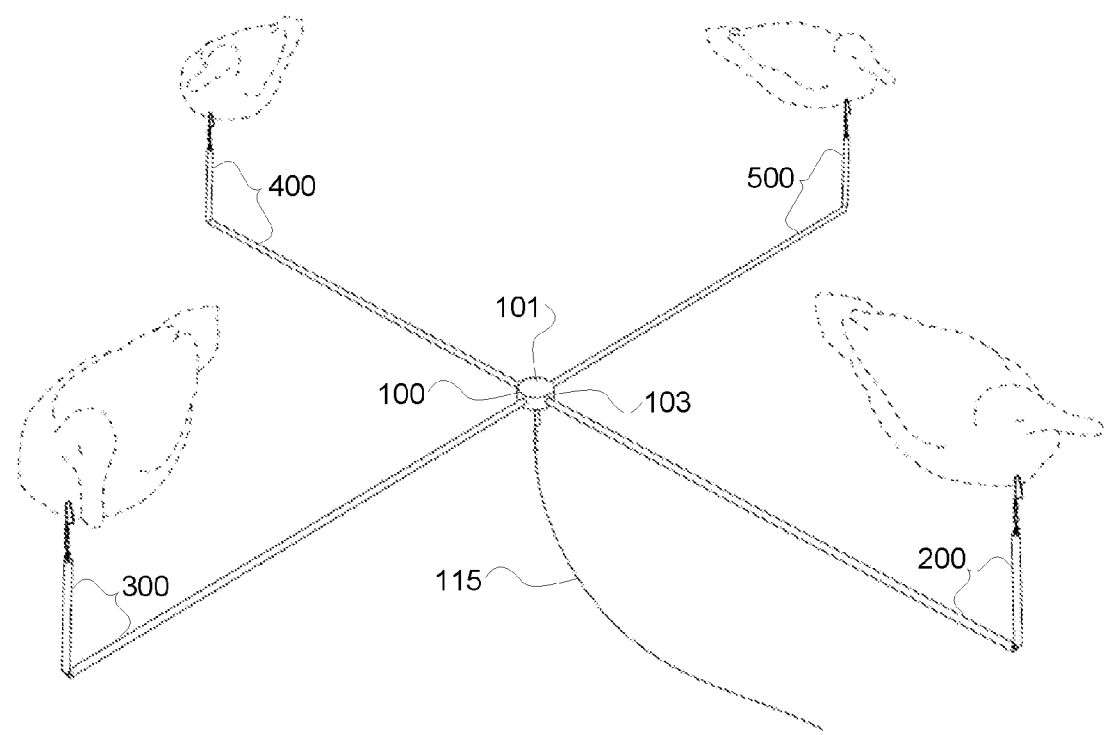
FIG. 1 is an isometric view of the animated decoy spreader.

This invention relates generally to hunting decoys, and more specifically, to animated decoy formations for water fowl. Specific details of certain embodiments of the invention are set forth in the following description and in FIGS. 1-9 to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

The present invention is an animated decoy spreader. It is designed to allow hunters to simulate the natural swimming and feeding motions of water fowl. Past attempts to create moving decoys have led to decoys that are stationary with moving parts, decoys that go in only one direction, and decoys that rely on complex mechanical or electrical systems to move the decoy. In an environment that necessarily includes water, mechanical and electrical systems can be corroded or destroyed. The present invention is a simple machine using a pulley type motion in combination with elastic components to pull decoys to and fro while allowing for significant randomness in the motion of the decoys. This creates the appearance of a small flock of water fowl swimming and feeding on a body of water while overcoming the shortcomings of past attempts.

FIG. 1 is an exemplary embodiment of the present invention. In one embodiment, the decoy spreader may be comprised of a hub 100. In one exemplary embodiment, hub 100 is a disk with a top surface 101, a bottom surface 102, and a cylindrical edge 103. In another embodiment, hub 100 may be spherical, square, a cross or "x" shape, a star shape, or any other shape without altering the function of the hub. Hub 100 may be any manner of rigid or semi-rigid material, such as a metal, wood, rubber, plastic, etc., without altering the function of the hub. The primary function of hub 100 is to centrally locate the decoy arrangement. The secondary function of hub 100 is to sink into the body of water, rendering the hub and other portions of the decoy spreader invisible to birds. This will be discussed in further detail in another portion of the specification.

In some embodiments, hub 100 is further comprised of a first aperture 104 on a first side 105. See FIG. 4a. In some embodiments, aperture 104 may lead to a first channel 106, which terminates at a second aperture 107 on a second side 108. In some embodiments, first side 105 and second side 108 may be adjacent sides. In some embodiments, first side 105 may be 180 degrees, or directly opposite, from the second side 108. In some embodiments, hub 100 may have a third aperture 109 on a third side 110. In some embodiments, a third aperture 109 may lead to a second channel 111, which terminates at a fourth aperture 112 on a fourth side 113 of hub 100. In some embodiments, hub 100 may have a fifth, sixth, seventh, eighth, etc. aperture, and each aperture may lead to at least one channel. This disclosure should not be construed as limiting the number of apertures or channels available in a hub. In some embodiments, hub 100 may have an eyelet 114, a loop, a hole, a ring, or some other means by which the hub can be coupled with a cord, a string, or some other flexible material. In some embodiments, hub 100 may include a pull cord 115. In one embodiment, pull cord 115 may be an elastic cord. In some embodiments, pull cord 115 may be an inelastic cord. In some embodiments, pull cord 115 may be a flexible material, such as fishing line, bungee material, rope, etc. In some embodiments, pull cord 115 may be a rigid material, such as metal, plastic, wood, etc. In some embodiments, pull cord 115 may be disposed through a handle. The function of pull cord 115 is to allow hub 100 to be moved through the body of water, which induces movement in the decoy array. Pull cord 115 can be any manner of material without impacting the function of the pull cord.

Figure 2A:
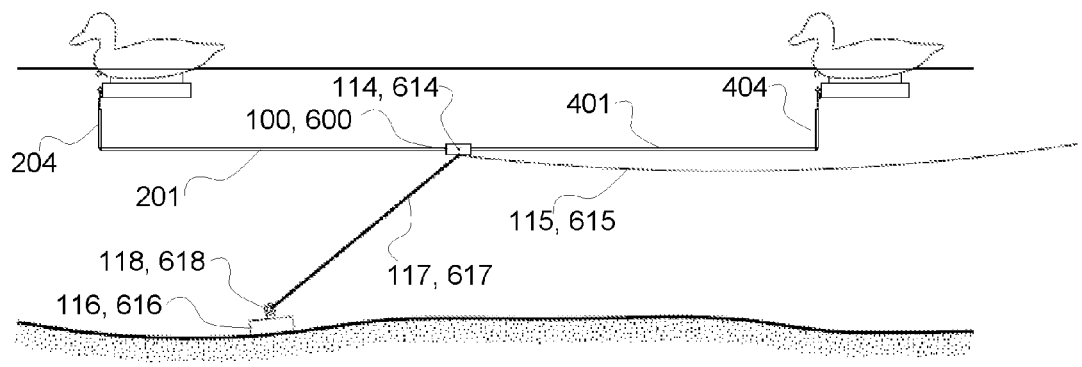
FIG. 2a is a side view of the animated decoy spreader in an anchored position.
Figure 2B:
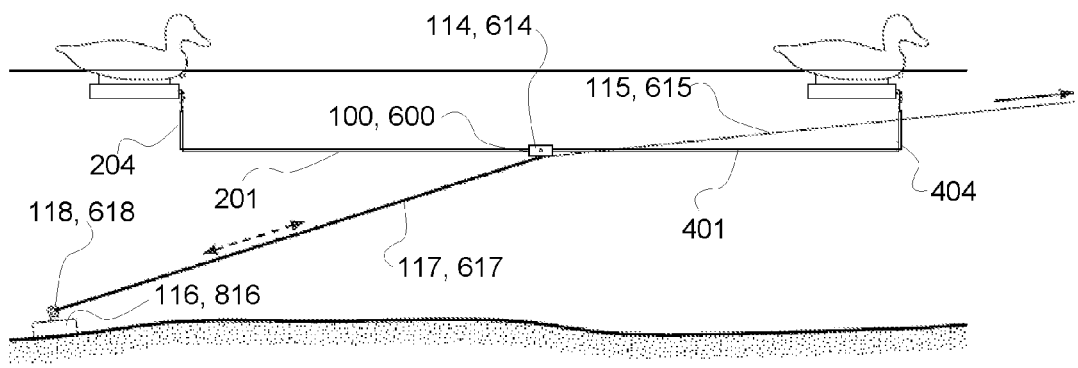
FIG. 2b is a side view of the animated decoy spreader in a displaced position.
Figure 3A:
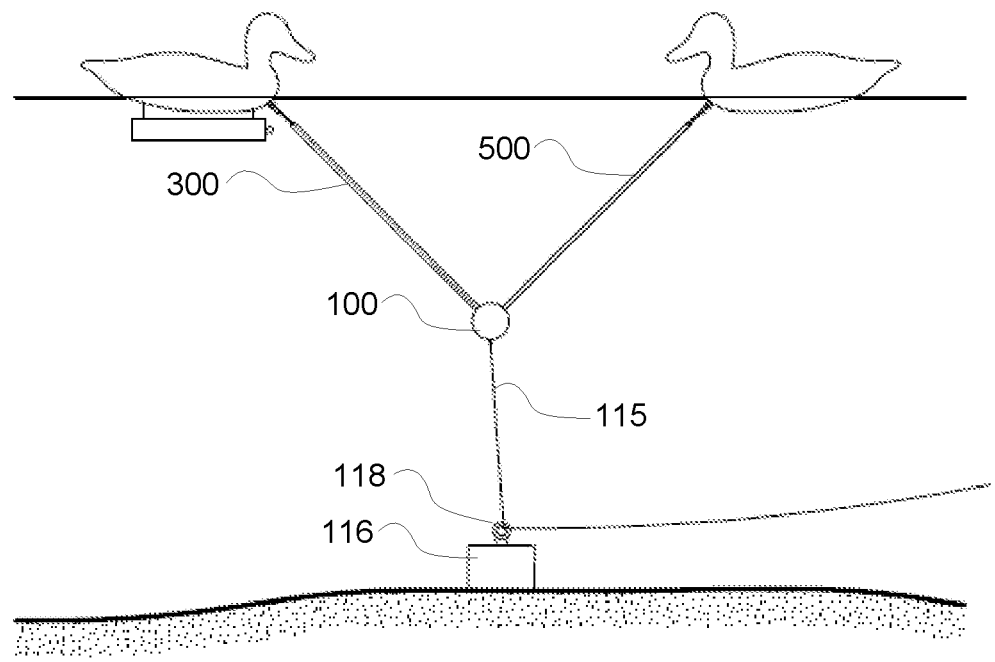
FIG. 3a is a side view of the animated decoy spreader in an anchored position, shown in the feeding configuration.
Figure 3B:
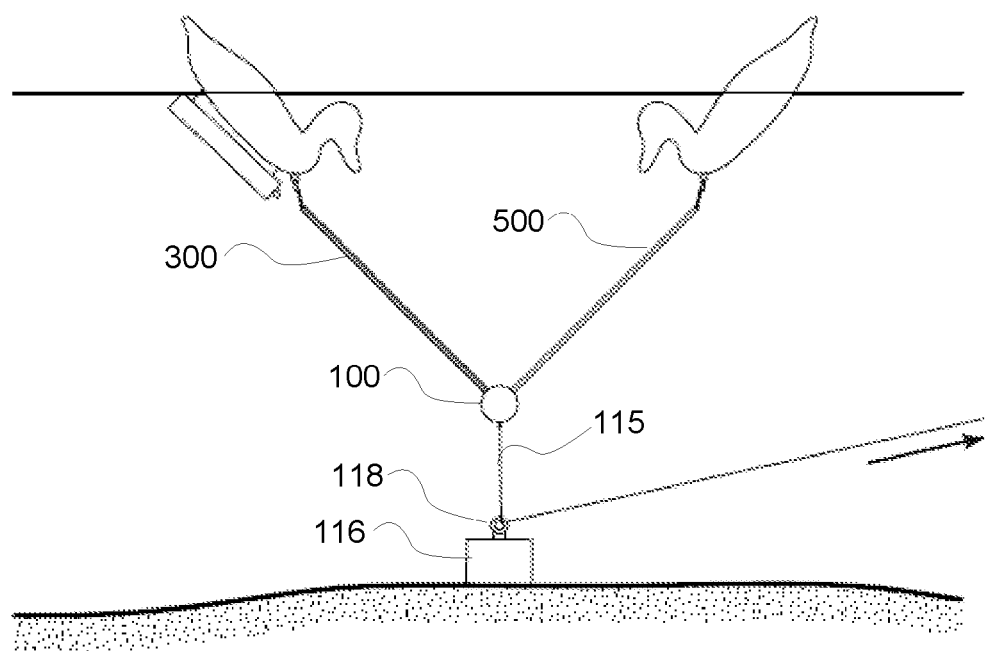
FIG. 3b is a side view of the animated decoy spreader in a displaced position, shown in the feeding configuration.

FIG. 2 is an environmental view of the animated decoy spreader. In some embodiments, the decoy spreader may be comprised of an anchor 116 which sits on the bottom of the body of water. In some embodiments, anchor 116 may be stuck into the bottom of the body of water, such as a rod inserted several inches into the ground. In some embodiments, anchor 116 may be disposed on a bank of the body of water. The function of anchor 116 is to locate hub 100 in a particular place in the body of water. In some embodiments, anchor 116 is coupled with hub 100 via anchor cord 117, which may pass through a hub eyelet 114 and an anchor eyelet 118. Anchor chord 117 may be an elastic or an inelastic flexible material, such as a fishing line or bungee type material. In one configuration, hub 100 is displaced via pull cord 115, and then returned to the anchor location by anchor cord 117. This allows the decoy arrangement to move to and fro in the water, simulating a natural swimming motion of water fowl. In another embodiment, anchor 116 is coupled with hub 100 with pull cord 115. In this configuration, the decoy arrangement is pulled under the surface of the water by some amount, simulating the natural feeding motion of water fowl. See FIG. 3.

Figure 6A:
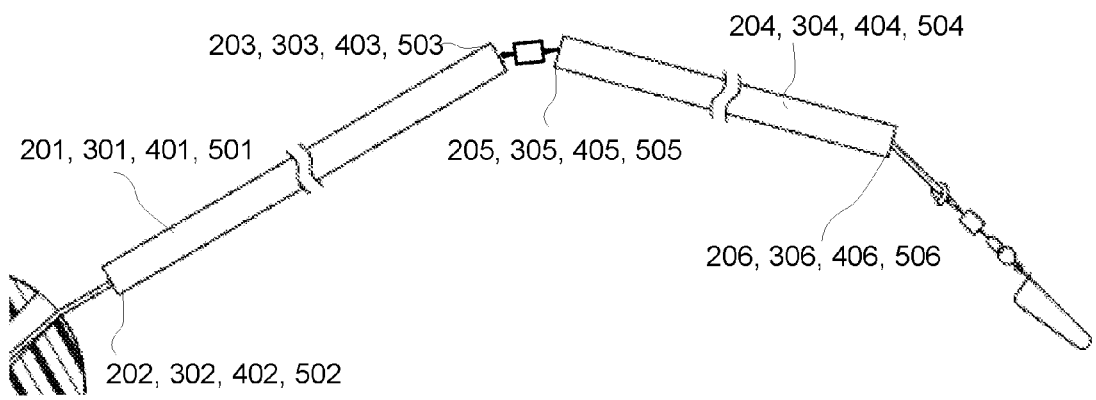
FIG. 6a is a detailed view of the arm arrangements for a first animated decoy spreader, showing a protective element between two arm components.
Figure 6B:
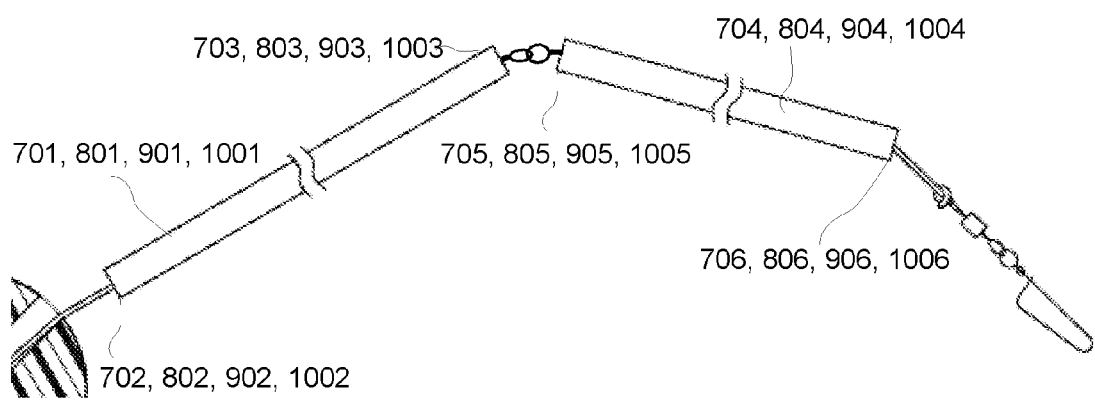
FIG. 6b is a detailed view of the arm arrangements for a second animated decoy spreader, showing the cable as a chain.
Figure 7A:
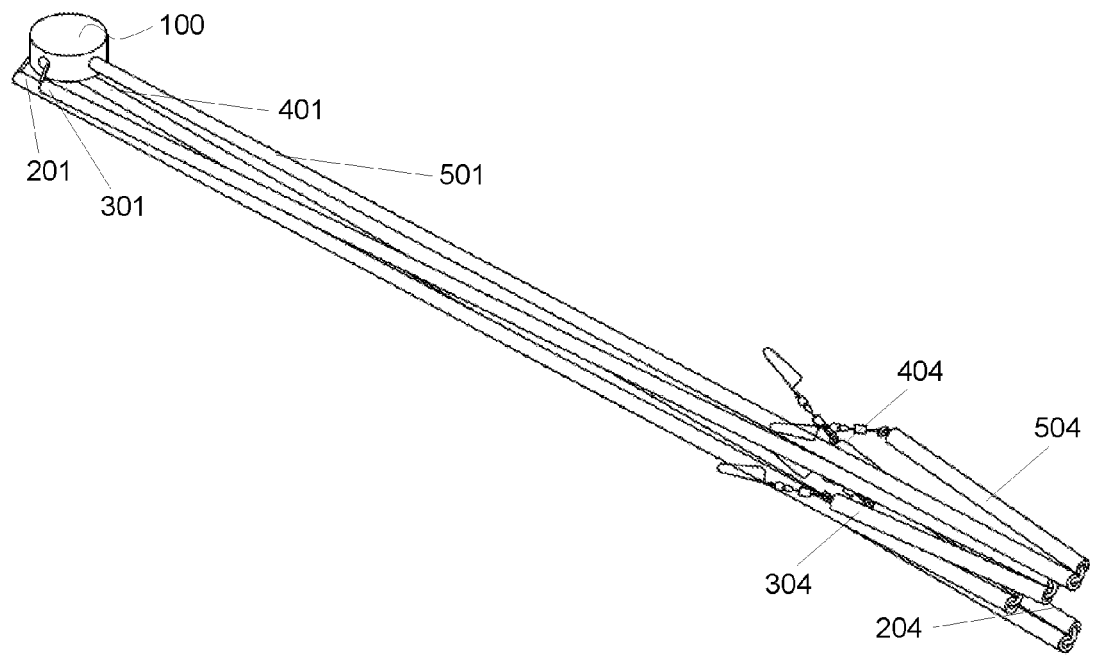
FIG. 7a is an isometric view of the animated decoy spreader in a collapsed state.
Figure 7B:
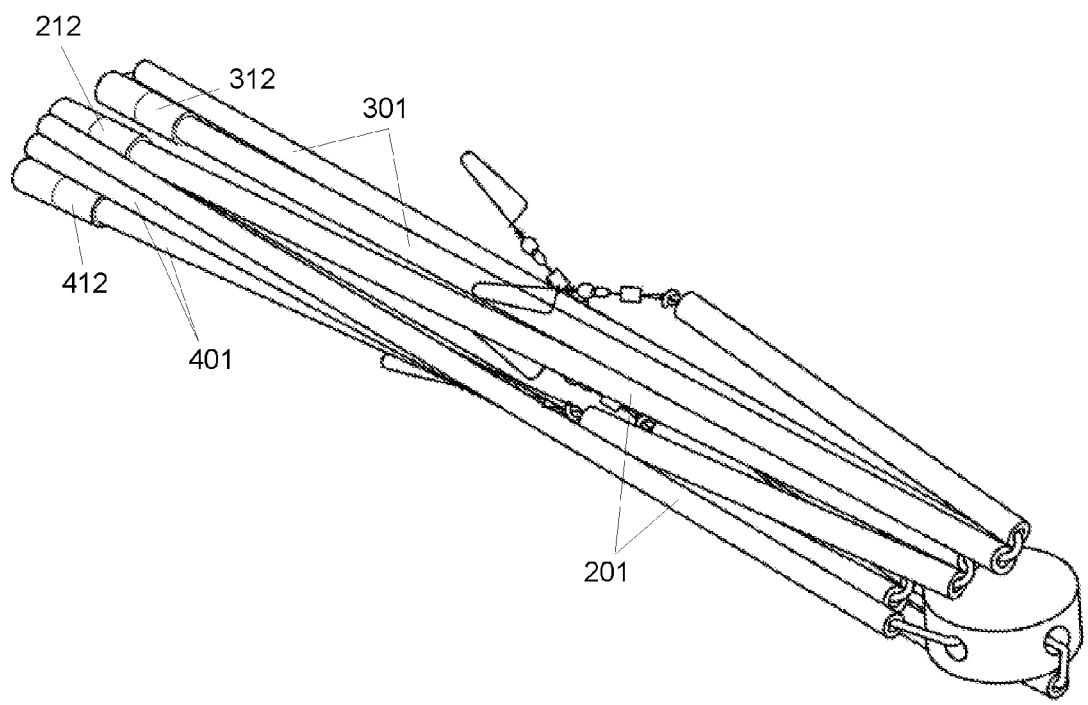
FIG. 7b is an isometric view of the animated decoy spreader in a collapsed state, showing the tubular member as removably coupleable elements.
Figure 8:
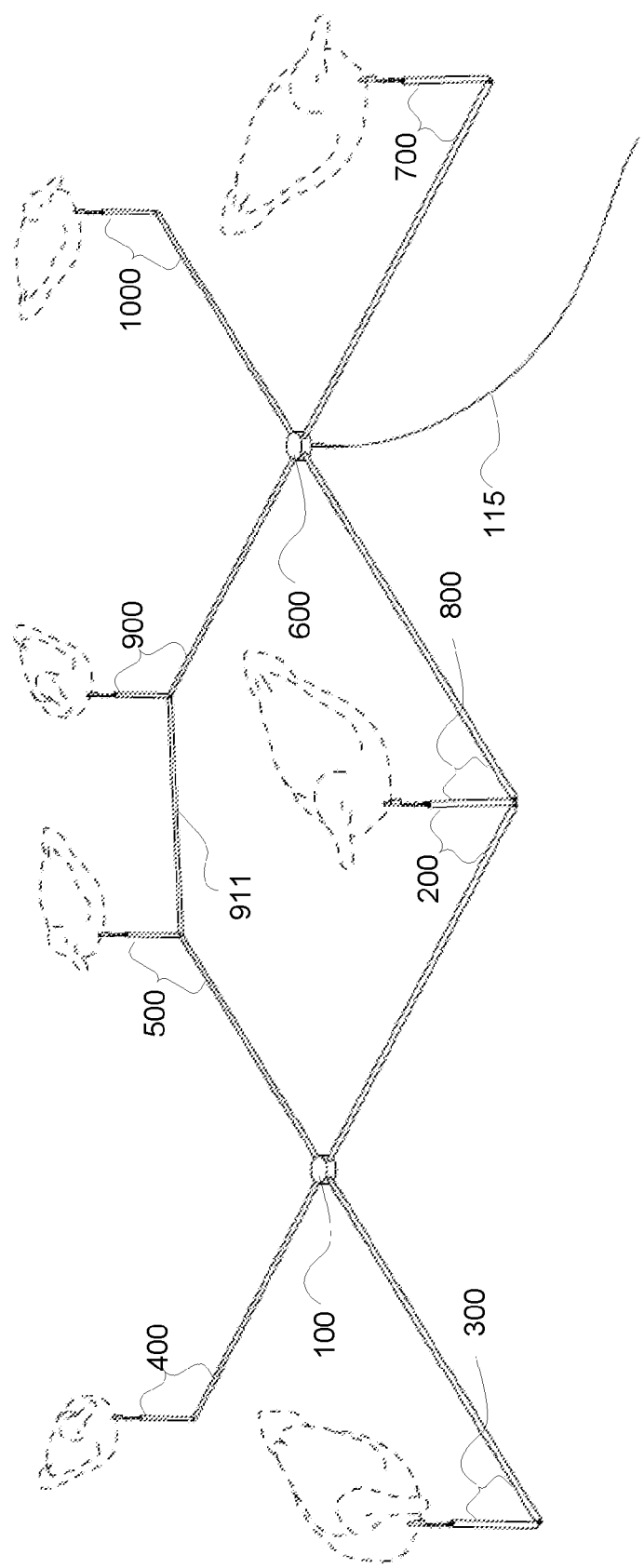
FIG. 8 is an isometric view of a first animated decoy spreader coupled with a second animated decoy spreader by way of a connector bar.
Figure 9:
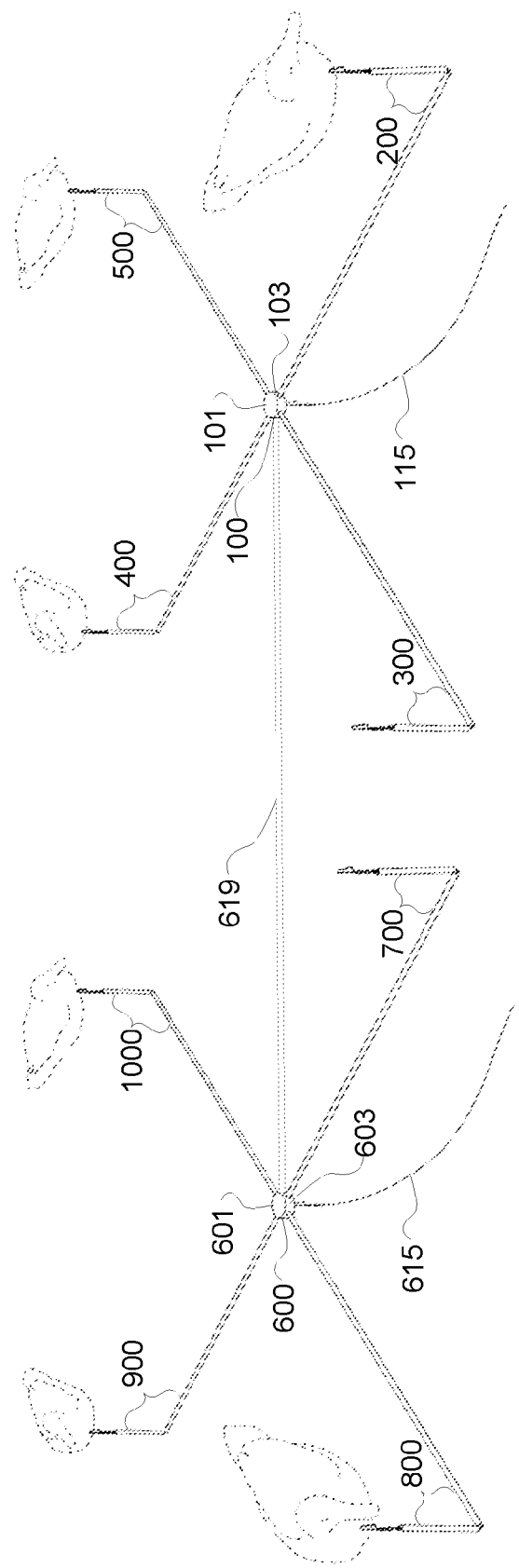
FIG. 9 is an isometric view of a first animated decoy spreader coupled with a second animated decoy spreader by way of a connector cord.

In some embodiments, the decoy spreader is further comprised of an arm arrangement 200. See e.g. FIG. 4, 6. Arm arrangement 200 may be comprised of a tubular member 201. Tubular member 201 has a hub end 202 and a far end 203, and it is hollow from the hub end to the far end. In some embodiments, the far end may contain a grommet. In some embodiments, the grommet may be a single piece. In some embodiments, the grommet may include an insertable piece and a cap piece. In some embodiments, the far end may have a protective coating. In some embodiments, the far end may have rounded edges. In some embodiments, the far end may be configured to prevent destructive friction on a cable. In some embodiments, tubular member 201 may be composed of two or more separable portions of substantially equal length and substantially equal diameter, as depicted in FIG. 7b. In some embodiments, the separable portions may be of unequal length. This allows the decoy spreader to collapse for transportation and storage. In some embodiments, these two portions may be joined by a ferrule 212. In some embodiments, these two portions may be joined by a male-female joint. In some embodiments, these two portions may be joined in any manner by which they are removably coupled, such as threads, snaps, etc., without altering the function of tubular member 201. In some embodiments, arm arrangement 200 may also include a cable 210. In an exemplary embodiment, cable 210 is disposed through aperture 104 and through the hollow of tubular member 201, coupling the tubular member with hub 100. In some embodiments, cable 210 may include a protective element, as seen in FIG. 6a. In some embodiments, cable 210 is inelastic. See FIG. 6b. In another embodiment, cable 210 is elastic. In some embodiments, cable 210 may be comprised of more than one segment. In some embodiments, each segment may be elastic. In some embodiments, each segment may be inelastic. In some embodiments, some segments may be elastic while other segments are inelastic. The primary function of cable 210 is to couple arm arrangement 200 with hub 100 such that tubular member 201 is removably coupleable with aperture 104. Cable 210 may be any flexible material without altering the function of the cable.

In some embodiments, arm arrangement 200 may be further comprised of a cylinder 204. Cylinder 204 is hollow from a first end 205 to a second end 206, and may be of substantially the same diameter as tubular member 201. In another embodiment, cylinder 204 may be a shorter length than tubular member 201. In some embodiments, cylinder 204 may be substantially the same length as tubular member 201. In some embodiments, cylinder 204 may be longer than tubular member 201. In some embodiments, cylinder 204 is located at the far end of tubular member 201. In some embodiments cylinder 204 is located between hub 100 and tubular member 201. In some embodiments, the first end may contain a grommet. In some embodiments, the grommet may be a single piece. In some embodiments, the grommet may include an insertable piece and a cap piece. In some embodiments, the first end may have a protective coating. In some embodiments, the first end may have rounded edges. The primary function of cylinder 204 is to create a joint in arm arrangement 200. This permits hub 100 to float below the surface of the body of water while decoys float on the surface, disguising the hub and arm arrangement 200 from the view of passing fowl. The secondary function of cylinder 204 is to allow the decoy spreader to collapse for transportation and storage. In some embodiments, cable 210 may be disposed through aperture 104, through the hollow of tubular member 201, and through the hollow of cylinder 204, coupling the tubular member and cylinder with hub 100. In some embodiments, cable 210 may include a protective element between tubular member 201 and cylinder 204, as seen in FIG. 6a.

FIG. 4 is a detailed view two alternate embodiments of the animated decoy spreader. In one embodiment, arm arrangement 200 may have a connecting member 207. In some embodiments, connecting member 207 may be an elastic material. In some embodiments, connecting member 207 may be a rigid material. In another embodiment, connecting member 207 is a loop 208. Loop 208 may be a single member with a catch 209 at one end into which the opposite end can be removably inserted to form a closed loop. Loop 208 may be a wire or any other semi-rigid material that allows the loop to open and close into itself. In some embodiments, connecting member 207 may be coupled with cable 210. In some embodiments, cable 210 is disposed through a loop on connecting member 207 and then crimped to secure connecting member 207 to arm arrangement 200. In some embodiments, connecting member 207 is coupled with cable 210 with a cement. In some embodiments, connecting member 207 is tied to cable 210 with a knot. In some embodiments, cable 210 may be a chain, a link of which may be coupled with connecting member 207 by passing through a loop on the connecting member or by weld. There are many methods by which connecting member 207 can be coupled with cable 210 without impacting the function of either member.

In some embodiments, the decoy spreader may be comprised of a second arm arrangement 300. Arm arrangement 300 may be comprised of a tubular member 301. Tubular member 301 has a hub end 302 and a far end 303, and it is hollow from the hub end to the far end. In some embodiments, the far end may contain a grommet. In some embodiments, the grommet may be a single piece. In some embodiments, the grommet may include an insertable piece and a cap piece. In some embodiments, the far end may have a protective coating. In some embodiments, the far end may have rounded edges. In some embodiments, the far end may be configured to prevent destructive friction on a cable. In some embodiments, tubular member 301 may be composed two or more separable portions of substantially equal length and substantially equal diameter, as depicted in FIG. 7b. In some embodiments, the separable portions may be of unequal length. This allows the decoy spreader to collapse for transportation and storage. In some embodiments, these two portions may be joined by a ferrule 312. In some embodiments, these two portions may be joined by a male-female joint. In some embodiments, these two portions may be joined in any manner by which they are removably coupled, such as threads, snaps, etc., without altering the function of tubular member 301. In some embodiments, arm arrangement 300 may also include a cable 310. In an exemplary embodiment, cable 310 is disposed through aperture 107 and through the hollow of tubular member 301, coupling the tubular member with hub 100. In some embodiments, cable 310 is inelastic. In another embodiment, cable 310 is elastic. In some embodiments, cable 310 may be comprised of more than one segment. In some embodiments, each segment may be elastic. In some embodiments, each segment may be inelastic. In some embodiments, some segments may be elastic while other segments are inelastic. The primary function of cable 310 is to couple arm arrangement 300 with hub 100 such that tubular member 301 is removably coupleable with aperture 107. Cable 310 may be any flexible material without altering the function of the cable.

Figure 4A:
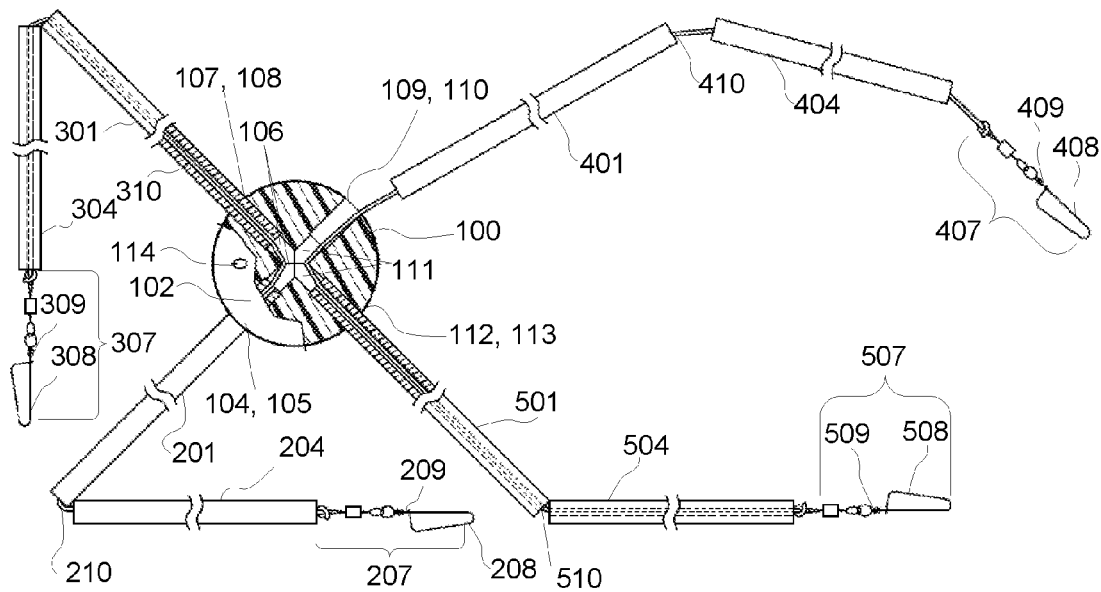
FIG. 4a is a detailed view of the hub and arm arrangements for a first animated decoy spreader.
Figure 4B:
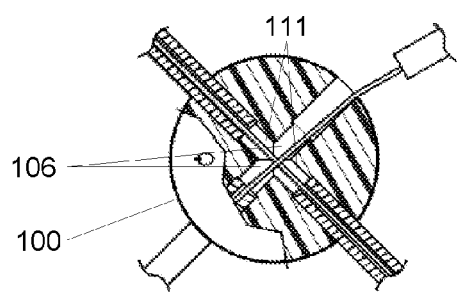
FIG. 4b is a detailed view of the hub in an alternate cable configuration.
Figure 5A:
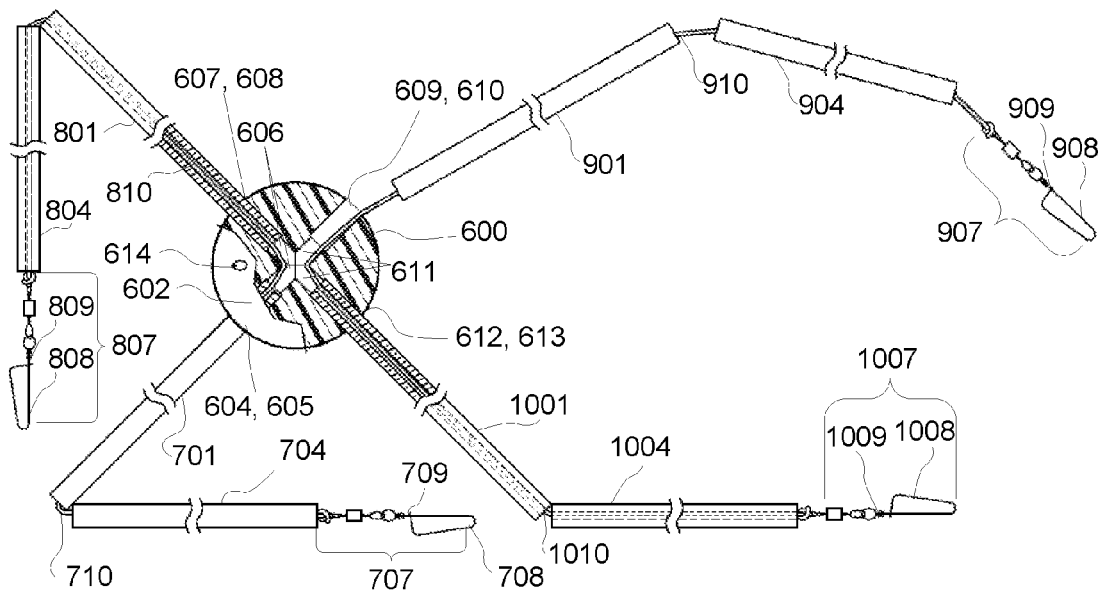
FIG. 5a is a detailed view of the hub and arm arrangements for a second animated decoy spreader.
Figure 5B:
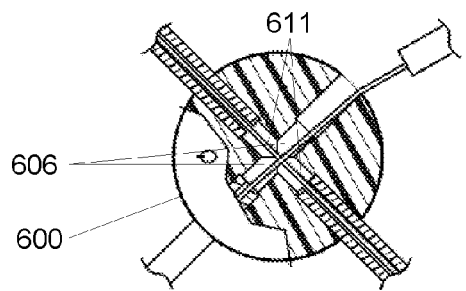
FIG. 5b is a detailed view of the hub in an alternate cable configuration.

In some embodiments, cable 210 and cable 310 may be a single cable. In this exemplary embodiment, cable 210 may be disposed through arm arrangement 200, aperture 104, channel 106, aperture 107, and arm arrangement 300. FIG. 4a is a depiction of this exemplary embodiment. In some embodiments, cable 210 and cable 410 may be a single cable. FIG. 4b is a depiction of this exemplary embodiment.

In some embodiments, arm arrangement 300 may be further comprised of a cylinder 304. Cylinder 304 is hollow from a first end 305 to a second end 306, and may be of substantially the same diameter as tubular member 301. In another embodiment, cylinder 304 may be a shorter length than the tubular member 301. In some embodiments, cylinder 304 may be substantially the same length as tubular member 301. In some embodiments, cylinder 304 may be longer than tubular member 301. In some embodiments, cylinder 304 is located at the far end of tubular member 301. In some embodiments cylinder 304 is located between hub 100 and tubular member 301. In some embodiments, the first end may contain a grommet. In some embodiments, the grommet may be a single piece. In some embodiments, the grommet may include an insertable piece and a cap piece. In some embodiments, the first end may have a protective coating. In some embodiments, the first end may have rounded edges. The primary function of cylinder 304 is to create a joint in arm arrangement 300. This permits hub 100 to float below the surface of the body of water while decoys float on the surface, disguising the hub and arm arrangement 300 from the view of passing fowl. The secondary function of cylinder 304 is to allow the decoy spreader to collapse for transportation and storage. In some embodiments, cable 310 may be disposed through aperture 104, through the hollow of tubular member 301, and through the hollow of cylinder 304, coupling the tubular member and cylinder with hub 100. In some embodiments, cable 310 may include a protective element between tubular member 301 and cylinder 304, as seen in FIG. 6a.

In another embodiment, arm arrangement 300 may have a connecting member 307. In some embodiments, connecting member 307 may be an elastic material. In some embodiments, connecting member 307 may be a rigid material. In another embodiment, connecting member 307 is a loop 308. Loop 308 may be a single member with a catch 309 at one end into which the opposite end can be removably inserted to form a closed loop. Loop 308 may be a wire or any other semi-rigid material that allows the loop to open and close into itself. In some embodiments, connecting member 307 may be coupled with cable 310. In some embodiments, cable 310 is disposed through a loop on connecting member 307 and then crimped to secure connecting member 307 to arm arrangement 300. In some embodiments, connecting member 307 is coupled with cable 310 with a cement. In some embodiments, connecting member 307 is tied to cable 310 with a knot. In some embodiments, cable 310 may be a chain, one link of which may be coupled with connecting member 307 by passing through a loop or by weld. There are many methods by which connecting member 307 can be coupled with cable 310 without impacting the function of either member.

In some embodiments, the decoy spreader may have a third arm arrangement 400. Arm arrangement 400 may be comprised of a tubular member 401. Tubular member 401 has a hub end 402 and a far end 403, and it is hollow from the hub end to the far end. In some embodiments, the far end may contain a grommet. In some embodiments, the grommet may be a single piece. In some embodiments, the grommet may include an insertable piece and a cap piece. In some embodiments, the far end may have a protective coating. In some embodiments, the far end may have rounded edges. In some embodiments, the far end may be configured to prevent destructive friction on a cable. In some embodiments, tubular member 401 may be composed of two or more separable portions of substantially equal length and substantially equal diameter, as depicted in FIG. 7b. In some embodiments, the separable portions may be of unequal length. This allows the decoy spreader to collapse for transportation and storage. In some embodiments, these two portions may be joined by a ferrule 412. In some embodiments, these two portions may be joined by a male-female joint. In some embodiments, these two portions may be joined in any manner by which they are removably coupled, such as threads, snaps, etc., without altering the function of tubular member 401. In some embodiments, arm arrangement 400 may also include a cable 410. In an exemplary embodiment, cable 410 is disposed through aperture 109 and through the hollow of tubular member 401, coupling the tubular member with hub 100. In some embodiments, cable 410 is inelastic. In another embodiment, cable 410 is elastic. In some embodiments, cable 410 may be comprised of more than one segment. In some embodiments, each segment may be elastic. In some embodiments, each segment may be inelastic. In some embodiments, some segments may be elastic while other segments are inelastic. The primary function of cable 410 is to couple arm arrangement 400 with hub 100 such that tubular member 401 is removably coupleable with aperture 104. Cable 410 may be any flexible material without altering the function of the cable.

In some embodiments, arm arrangement 400 may be further comprised of a cylinder 404. Cylinder 404 is hollow from a first end 405 to a second end 406, and may be of substantially the same diameter as tubular member 401. In another embodiment, cylinder 404 may be a shorter length than tubular member 401. In some embodiments, cylinder 404 may be substantially the same length as tubular member 401. In some embodiments, cylinder 404 may be longer than tubular member 401. In some embodiments, cylinder 404 is located at the far end of tubular member 401. In some embodiments cylinder 404 is located between hub 100 and tubular member 401. In some embodiments, the first end may contain a grommet. In some embodiments, the grommet may be a single piece. In some embodiments, the grommet may include an insertable piece and a cap piece. In some embodiments, the first end may have a protective coating. In some embodiments, the first end may have rounded edges. The primary function of cylinder 404 is to create a joint in arm arrangement 400. This permits hub 100 to float below the surface of the body of water while decoys float on the surface, disguising the hub and arm arrangement 400 from the view of passing fowl. The secondary function of cylinder 404 is to allow the decoy spreader to collapse for transportation and storage. In some embodiments, cable 410 may be disposed through aperture 109, through the hollow of tubular member 401, and through the hollow of cylinder 404, coupling the tubular member and cylinder with hub 100. In some embodiments, cable 410 may include a protective element between tubular member 401 and cylinder 404, as seen in FIG. 6a.

In another embodiment, arm arrangement 400 may have a connecting member 407. In some embodiments, connecting member 407 may be an elastic material. In some embodiments, connecting member 407 may be a rigid material. In another embodiment, connecting member 407 is a loop 408. Loop 408 may be a single member with a catch 409 at one end into which the opposite end can be removably inserted to form a closed loop. Loop 408 may be a wire or any other semi-rigid material that allows the loop to open and close into itself. In some embodiments, connecting member 407 may be coupled with cable 410. In some embodiments, cable 410 is disposed through a loop on connecting member 407 and then crimped to secure connecting member 407 to arm arrangement 400. In some embodiments, connecting member 407 is coupled with cable 410 with a cement. In some embodiments, connecting member 407 is tied to cable 410 with a knot. In some embodiments, cable 410 may be a chain, one link of which may be coupled with connecting member 407 by passing through a loop or by weld. There are many methods by which connecting member 407 can be coupled with cable 410 without impacting the function of either member.

In some embodiments, the decoy spreader may be comprised of a fourth arm arrangement 500. Arm arrangement 500 may be comprised of a tubular member 501. Tubular member 501 has a hub end 502 and a far end 503, and it is hollow from the hub end to the far end. In some embodiments, the far end may contain a grommet. In some embodiments, the grommet may be a single piece. In some embodiments, the grommet may include an insertable piece and a cap piece. In some embodiments, the far end may have a protective coating. In some embodiments, the far end may have rounded edges. In some embodiments, the far end may be configured to prevent destructive friction on a cable. In some embodiments, tubular member 501 may be composed of two or more separable portions of substantially equal length and substantially equal diameter, as depicted in FIG.

7b. In some embodiments, the separable portions may be of unequal length. This allows the decoy spreader to collapse for transportation and storage. In some embodiments, these two portions may be joined by a ferrule. This ferrule is not labeled in FIG. 7b, but it is identical to and interchangeable with the parts labeled. In some embodiments, these two portions may be joined by a male-female joint. In some embodiments, these two portions may be joined in any manner by which they are removably coupled, such as threads, snaps, etc., without altering the function of tubular member 501. In some embodiments, arm arrangement 500 may also include a cable 510. In an exemplary embodiment, cable 510 is disposed through aperture 112 and through the hollow of tubular member 501, coupling the tubular member with hub 100. In some embodiments, cable 510 is inelastic. In another embodiment, cable 510 is elastic. In some embodiments, cable 510 may be comprised of more than one segment. In some embodiments, each segment may be elastic. In some embodiments, each segment may be inelastic. In some embodiments, some segments may be elastic while other segments are inelastic. The primary function of cable 510 is to couple arm arrangement 500 with hub 100 such that tubular member 501 is removably coupleable with aperture 112. Cable 510 may be any flexible material without altering the function of the cable.

In some embodiments, cable 410 and cable 510 may be a single cable. In this exemplary embodiment, cable 410 may be disposed through arm arrangement 400, aperture 109, channel 111, aperture 112, and arm arrangement 500. FIG. 4a is a depiction of this exemplary embodiment. In some embodiments, cable 310 and cable 510 may be a single cable. FIG. 4b is a depiction of this exemplary embodiment.

In some embodiments, arm arrangement 500 may be further comprised of a cylinder 504. Cylinder 504 is hollow from a first end 505 to a second end 506, and may be of substantially the same diameter as tubular member 501. In another embodiment, cylinder 504 may be a shorter length than tubular member 501. In some embodiments, cylinder 504 may be substantially the same length as tubular member 501. In some embodiments, cylinder 504 may be longer than tubular member 501. In some embodiments, cylinder 504 is located at the far end of tubular member 501. In some embodiments cylinder 504 is located between hub 100 and tubular member 501. In some embodiments, the first end may contain a grommet. In some embodiments, the grommet may be a single piece. In some embodiments, the grommet may include an insertable piece and a cap piece. In some embodiments, the first end may have a protective coating. In some embodiments, the first end may have rounded edges. The primary function of cylinder 504 is to create a joint in the arm arrangement 500. This permits hub 100 to float below the surface of the body of water while decoys float on the surface, disguising the hub and arm arrangement 500 from the view of passing fowl. The secondary function of cylinder 504 is to allow the decoy spreader to collapse for transportation and storage. In some embodiments, cable 510 may be disposed through aperture 104, through the hollow of tubular member 501, and through the hollow of cylinder 504, coupling the tubular member and cylinder with hub 100. In some embodiments, cable 510 may include a protective element between tubular member 501 and cylinder 504, as seen in FIG. 6a.

In another embodiment, arm arrangement 500 may have a connecting member 507. In some embodiments, connecting member 507 may be an elastic material. In some embodiments, connecting member 507 may be a rigid material. In some embodiments, connecting member 507 is a loop 508. Loop 508 may be a single member with a catch 509 at one end into which the opposite end can be removably inserted to form a closed loop. Loop 508 may be a wire or any other semi-rigid material that allows the loop to open and close into itself. In some embodiments, connecting member 507 may be coupled with cable 510. In some embodiments, cable 510 is disposed through a loop on connecting member 507 and then crimped to secure connecting member 507 to arm arrangement 500. In some embodiments, connecting member 507 is coupled with cable 510 with a cement. In some embodiments, connecting member 507 is tied to cable 510 with a knot. In some embodiments, cable 510 may be a chain, one link of which may be coupled with connecting member 507 by passing through a loop or by weld. There are many methods by which connecting member 507 can be coupled with cable 510 without impacting the function of either member.

The present invention may be comprised of a plurality of arm arrangements of similar configurations disclosed herein. This disclosure should not be construed as limiting the number of arm arrangements to four. The animated decoy spreader may in fact have any number of arm arrangements connected with the hub.

The present invention may be comprised of a second hub 600. See FIG. 5. In one exemplary embodiment, hub 600 is a disk with a top surface 601, a bottom surface 602, and a cylindrical edge 603. In another embodiment, the hub may be spherical, square, or any other shape without altering the function of the hub. Hub 600 may be any manner of rigid or semi-rigid material, such as metal, wood, rubber, plastic, etc., without altering the function of the hub. The primary function of hub 600 is to centrally locate the decoy arrangement. The secondary function of hub 600 is to sink into the body of water, rendering the hub and other portions of the decoy spreader invisible to birds in flight. This will be discussed in further detail in another portion of the specification.

In some embodiments, second hub 600 is further comprised of a first aperture 604 on a first side 605. In some embodiments, aperture 604 may lead to a first channel 606, which terminates at a second aperture 607 on a second side 608. In some embodiments, first side 605 and second side 608 may be adjacent sides. In some embodiments, first side 605 may be 180 degrees, or directly opposite, from second side 608. In some embodiments, hub 600 may have a third aperture 609 on a third side 610. In some embodiments, a third aperture 609 may lead to a second channel 611, which terminates at a fourth aperture 612 on a fourth side 613 of hub 600. In some embodiments, hub 100 may have a fifth, sixth, seventh, eighth, etc. aperture, and each aperture may lead to at least one channel. This disclosure should not be construed as limiting the number of apertures or channels available in a hub. In some embodiments, hub 600 may have an eyelet 614, a loop, a hole, a ring, or some other means by which the hub can be coupled with a cord, a string, or some other flexible material. In some embodiments, hub 600 may include a pull cord 615. In one embodiment, pull cord 615 may be an elastic cord. In some embodiments, pull cord 615 may be an inelastic cord. In some embodiments, pull cord 615 may be a flexible material, such as fishing line, bungee material, rope, etc. In some embodiments, pull cord 615 may be a rigid material, such as metal, plastic, wood, etc. The function of pull cord 615 is to allow hub 600 to be moved through the body of water, which induces movement in the decoy array. Pull cord 615 can be any manner of material without impacting the function of the pull cord.

In some embodiments, the decoy spreader may be comprised of an anchor 616 which sits on the bottom of the body of water. The function of anchor 616 is to locate hub 600 and decoy arrangement in a particular place in the body of water. In some embodiments, anchor 616 is coupled with hub 600 via anchor cord 617, which may pass through a hub eyelet 614 and an anchor eyelet 618. Anchor chord 617 may be an elastic or an inelastic flexible material. In one configuration, hub 600 is displaced via pull cord 615, and then returned to the anchor location by anchor cord 617. This allows the decoy arrangement to move to and fro in the water, simulating a natural swimming motion of water fowl. See FIG. 2. In another embodiment, anchor 616 is coupled with hub 600 with pull cord 615. In this configuration, the decoy arrangement is pulled under the surface of the water by some amount, simulating the natural feeding motion of water fowl. See FIG. 3.

In some embodiments, the decoy spreader is further comprised of a fifth arm arrangement 700. Arm arrangement 700 may be comprised of a tubular member 701. The tubular member 701 has a hub end 702 and a far end 703, and it is hollow from the hub end to the far end. In some embodiments, the far end may contain a grommet. In some embodiments, the grommet may be a single piece. In some embodiments, the grommet may include an insertable piece and a cap piece. In some embodiments, the far end may have a protective coating. In some embodiments, the far end may have rounded edges. In some embodiments, the far end may be configured to prevent destructive friction on a cable. In some embodiments, tubular member 701 may be composed of two or more separable portions of substantially equal length and substantially equal diameter, as depicted in FIG. 7b. In some embodiments, the separable portions may be of unequal length. This allows the decoy spreader to collapse for transportation and storage. In some embodiments, these two portions may be joined by a ferrule. This ferrule is not labeled in FIG. 7b, but it is identical to and interchangeable with the parts labeled. In some embodiments, these two portions may be joined by a male-female joint. In some embodiments, these two portions may be joined in any manner by which they are removably coupled, such as threads, snaps, etc., without altering the function of tubular member 701. In some embodiments, arm arrangement 700 may also include a cable 710. In an exemplary embodiment, cable 710 is disposed through aperture 604 and through the hollow of tubular member 701, coupling the tubular member with hub 600. In some embodiments, cable 710 is inelastic. In another embodiment, cable 710 is elastic. In some embodiments, cable 710 may be comprised of more than one segment. In some embodiments, each segment may be elastic. In some embodiments, each segment may be inelastic. In some embodiments, some segments may be elastic while other segments are inelastic. The primary function of cable 710 is to couple arm arrangement 700 with hub 600 such that tubular member 701 is removably coupleable with aperture 604. Cable 710 may be any flexible material without altering the function of the cable.

In some embodiments, arm arrangement 700 may be further comprised of a cylinder 704. Cylinder 704 is hollow from a first end 705 to a second end 706, and may be of substantially the same diameter as tubular member 701. In another embodiment, cylinder 704 may be a shorter length than tubular member 701. In some embodiments, cylinder 704 may be substantially the same length as tubular member 701. In some embodiments, cylinder 704 may be longer than tubular member 701. In some embodiments, cylinder 704 is located at the far end of tubular member 701. In some embodiments cylinder 704 is located between hub 600 and tubular member 701. In some embodiments, the first end may contain a grommet. In some embodiments, the grommet may be a single piece. In some embodiments, the grommet may include an insertable piece and a cap piece. In some embodiments, the first end may have a protective coating. In some embodiments, the first end may have rounded edges. The primary function of cylinder 704 is to create a joint in arm arrangement 700. This permits hub 600 to float below the surface of the body of water while decoys float on the surface, disguising the hub and arm arrangement 700 from the view of passing fowl. The secondary function of cylinder 704 is to allow the decoy spreader to collapse for transportation and storage. In some embodiments, cable 710 may be disposed through aperture 604, through the hollow of tubular member 701, and through the hollow of cylinder 704, coupling the tubular member and cylinder with hub 600. In some embodiments, cable 710 may include a protective element between tubular member 701 and cylinder 704, as seen in FIG. 6a.

In another embodiment, arm arrangement 700 may have a connecting member 707. In some embodiments, connecting member 707 may be an elastic material. In some embodiments, connecting member 707 may be a rigid material. In another embodiment, connecting member 707 is a loop 708. Loop 708 may be a single member with a catch 709 at one end into which the opposite end can be removably inserted to form a closed loop. Loop 708 may be a wire or any other semi-rigid material that allows the loop to open and close into itself. In some embodiments, connecting member 707 may be coupled with cable 710. In some embodiments, cable 710 is disposed through a loop on connecting member 707 and then crimped to secure connecting member 707 to arm arrangement 700. In some embodiments, connecting member 707 is coupled with cable 710 with a cement. In some embodiments, connecting member 707 is tied to cable 710 with a knot. In some embodiments, cable 710 may be a chain, one link of which may be coupled with connecting member 707 by passing through a loop or by weld. There are many methods by which connecting member 707 can be coupled with cable 710 without impacting the function of either member.

In some embodiments, the decoy spreader may be comprised of a sixth arm arrangement 800. Arm arrangement 800 may be comprised of a tubular member 801. Tubular member 801 has a hub end 802 and a far end 803, and it is hollow from the hub end to the far end. In some embodiments, the far end may contain a grommet. In some embodiments, the grommet may be a single piece. In some embodiments, the grommet may include an insertable piece and a cap piece. In some embodiments, the far end may have a protective coating. In some embodiments, the far end may have rounded edges. In some embodiments, the far end may be configured to prevent destructive friction on a cable. In some embodiments, tubular member 801 may be composed of two or more separable portions of substantially equal length and substantially equal diameter, as depicted in FIG. 7b. In some embodiments, the separable portions may be of unequal length. This allows the decoy spreader to collapse for transportation and storage. In some embodiments, these two portions may be joined by a ferrule. This ferrule is not labeled in FIG. 7b, but it is identical to and interchangeable with the parts labeled. In some embodiments, these two portions may be joined by a male-female joint. In some embodiments, these two portions may be joined in any manner by which they are removably coupled, such as threads, snaps, etc., without altering the function of tubular member 801. In some embodiments, arm arrangement 800 may also include a cable 810. In an exemplary embodiment, cable 810 is disposed through aperture 607 and through the hollow of tubular member 801, coupling the tubular member with hub 600. In some embodiments, cable 810 is inelastic. In another embodiment, cable 810 is elastic. In some embodiments, cable 810 may be comprised of more than one segment. In some embodiments, each segment may be elastic. In some embodiments, each segment may be inelastic. In some embodiments, some segments may be elastic while other segments are inelastic. The primary function of cable 810 is to couple arm arrangement 800 with hub 600 such that tubular member 801 is removably coupleable with aperture 607. Cable 810 may be any flexible material without altering the function of the cable.

In some embodiments, cable 710 and cable 810 may be a single cable. In this exemplary embodiment, cable 710 may be disposed through arm arrangement 700, aperture 604, channel 606, aperture 607, and arm arrangement 800. FIG. 4a is a depiction of this exemplary embodiment. In some embodiments, cable 710 and cable 910 may be a single cable. FIG. 4b is a depiction of this exemplary embodiment.

In some embodiments, arm arrangement 800 may be further comprised of a cylinder 804. Cylinder 804 is hollow from a first end 805 to a second end 806, and may be of substantially the same diameter as tubular member 801. In another embodiment, cylinder 804 may be a shorter length than tubular member 801. In some embodiments, cylinder 804 may be substantially the same length as tubular member 801. In some embodiments, cylinder 804 may be longer than tubular member 801. In some embodiments, cylinder 804 is located at the far end of tubular member 801. In some embodiments cylinder 804 is located between hub 600 and tubular member 801. In some embodiments, the first end may contain a grommet. In some embodiments, the grommet may be a single piece. In some embodiments, the grommet may include an insertable piece and a cap piece. In some embodiments, the first end may have a protective coating. In some embodiments, the first end may have rounded edges. The primary function of cylinder 804 is to create a joint in arm arrangement 800. This permits hub 600 to float below the surface of the body of water while decoys float on the surface, disguising the hub and arm arrangement 800 from the view of passing fowl. The secondary function of cylinder 804 is to allow the decoy spreader to collapse for transportation and storage. In some embodiments, cable 810 may be disposed through aperture 604, through the hollow of tubular member 801, and through the hollow of cylinder 804, coupling the tubular member and cylinder with hub 600. In some embodiments, cable 810 may include a protective element between tubular member 801 and cylinder 804, as seen in FIG. 6a.

In another embodiment, arm arrangement 800 may have a connecting member 807. In some embodiments, connecting member 807 may be an elastic material. In some embodiments, connecting member 807 may be a rigid material. In another embodiment, connecting member 807 is a loop 808. Loop 808 may be a single member with a catch 809 at one end into which the opposite end can be removably inserted to form a closed loop. Loop 808 may be a wire or any other semi-rigid material that allows the loop to open and close into itself. In some embodiments, connecting member 807 may be coupled with cable 810. In some embodiments, cable 810 is disposed through a loop on connecting member 807 and then crimped to secure connecting member 807 to arm arrangement 800. In some embodiments, connecting member 807 is coupled with cable 810 with a cement. In some embodiments, connecting member 807 is tied to cable 810 with a knot. In some embodiments, cable 810 may be a chain, one link of which may be coupled with connecting member 807 by passing through a loop or by weld. There are many methods by which connecting member 807 can be coupled with cable 810 without impacting the function of either member.

In some embodiments, the decoy spreader may have a seventh arm arrangement 900. Arm arrangement 900 may be comprised of a tubular member 901. Tubular member 901 has a hub end 902 and a far end 903, and it is hollow from the hub end to the far end. In some embodiments, the far end may contain a grommet. In some embodiments, the grommet may be a single piece. In some embodiments, the grommet may include an insertable piece and a cap piece. In some embodiments, the far end may have a protective coating. In some embodiments, the far end may have rounded edges. In some embodiments, the far end may be configured to prevent destructive friction on a cable. In some embodiments, tubular member 901 may be composed of two or more separable portions of substantially equal length and substantially equal diameter, as depicted in FIG. 7b. In some embodiments, the separable portions may be of unequal length. This allows the decoy spreader to collapse for transportation and storage. In some embodiments, these two portions may be joined by a ferrule. This ferrule is not labeled in FIG. 7b, but it is identical to and interchangeable with the parts labeled. In some embodiments, these two portions may be joined by a male-female joint. In some embodiments, these two portions may be joined in any manner by which they are removably coupled, such as threads, snaps, etc., without altering the function of tubular member 901. In some embodiments, arm arrangement 900 may also include a cable 910. In an exemplary embodiment, cable 910 is disposed through aperture 609 and through the hollow of tubular member 901, coupling the tubular member with hub 600. In some embodiments, cable 910 is inelastic. In another embodiment, cable 910 is elastic. In some embodiments, cable 910 may be comprised of more than one segment. In some embodiments, each segment may be elastic. In some embodiments, each segment may be inelastic. In some embodiments, some segments may be elastic while other segments are inelastic. The primary function of cable 910 is to couple arm arrangement 900 with hub 600 such that tubular member 901 is removably coupleable with aperture 604. Cable 910 may be any flexible material without altering the function of the cable.

In some embodiments, arm arrangement 900 may be further comprised of a cylinder 904. Cylinder 904 is hollow from a first end 905 to a second end 906, and may be of substantially the same diameter as tubular member 901. In another embodiment, cylinder 904 may be a shorter length than tubular member 901. In some embodiments, cylinder 904 may be substantially the same length as tubular member 901. In some embodiments, cylinder 904 may be longer than tubular member 901. In some embodiments, cylinder 904 is located at the far end of tubular member 901. In some embodiments cylinder 904 is located between hub 600 and tubular member 901. In some embodiments, the first end may contain a grommet. In some embodiments, the grommet may be a single piece. In some embodiments, the grommet may include an insertable piece and a cap piece. In some embodiments, the first end may have a protective coating. In some embodiments, the first end may have rounded edges. The primary function of cylinder 904 is to create a joint in arm arrangement 900. This permits hub 600 to float below the surface of the body of water while decoys float on the surface, disguising the hub and arm arrangement 900 from the view of passing fowl. The secondary function of cylinder 904 is to allow the decoy spreader to collapse for transportation and storage. In some embodiments, cable 910 may be disposed through aperture 609, through the hollow of tubular member 901, and through the hollow of cylinder 904, coupling the tubular member and cylinder with hub 600. In some embodiments, cable 910 may include a protective element between tubular member 901 and cylinder 904, as seen in FIG. 6a.

In another embodiment, arm arrangement 900 may have a connecting member 907. In some embodiments, connecting member 907 may be an elastic material. In some embodiments, connecting member 907 may be a rigid material. In another embodiment, connecting member 907 is a loop 908. Loop 908 may be a single member with a catch 909 at one end into which the opposite end can be removably inserted to form a closed loop. Loop 908 may be a wire or any other semi-rigid material that allows the loop to open and close into itself. In some embodiments, connecting member 907 may be coupled with cable 910. In some embodiments, cable 910 is disposed through a loop on connecting member 907 and then crimped to secure connecting member 907 to arm arrangement 900. In some embodiments, connecting member 907 is coupled with cable 910 with a cement. In some embodiments, connecting member 907 is tied to cable 910 with a knot. In some embodiments, cable 910 may be a chain, one link of which may be coupled with connecting member 907 by passing through a loop or by weld. There are many methods by which connecting member 907 can be coupled with cable 910 without impacting the function of either member.

In some embodiments, the decoy spreader may be comprised of an eighth arm arrangement 1000. Arm arrangement 1000 may be comprised of a tubular member 1001. Tubular member 1001 has a hub end 1002 and a far end 1003, and it is hollow from the hub end to the far end. In some embodiments, the far end may contain a grommet. In some embodiments, the grommet may be a single piece. In some embodiments, the grommet may include an insertable piece and a cap piece. In some embodiments, the far end may have a protective coating. In some embodiments, the far end may have rounded edges. In some embodiments, the far end may be configured to prevent destructive friction on a cable. In some embodiments, tubular member 1001 may be composed of two or more separable portions of substantially equal length and substantially equal diameter, as depicted in FIG. 7b. In some embodiments, the separable portions may be of unequal length. This allows the decoy spreader to collapse for transportation and storage. In some embodiments, these two portions may be joined by a ferrule. This ferrule is not labeled in FIG. 7b, but it is identical to and interchangeable with the parts labeled. In some embodiments, these two portions may be joined by a male-female joint. In some embodiments, these two portions may be joined in any manner by which they are removably coupled, such as threads, snaps, etc., without altering the function of tubular member 1001. In some embodiments, arm arrangement 1000 may also include a cable 1010. In an exemplary embodiment, cable 1010 is disposed through aperture 612 and through the hollow of tubular member 1001, coupling the tubular member with hub 600. In some embodiments, cable 1010 is inelastic. In another embodiment, cable 1010 is elastic. In some embodiments, cable 1010 may be comprised of more than one segment. In some embodiments, each segment may be elastic. In some embodiments, each segment may be inelastic. In some embodiments, some segments may be elastic while other segments are inelastic. The primary function of cable 1010 is to couple arm arrangement 1000 with hub 600 such that tubular member 1001 is removably coupleable with aperture 612. Cable 1010 may be any flexible material without altering the function of the cable.

In some embodiments, cable 910 and cable 1010 may be a single cable. In this exemplary embodiment, cable 910 may be disposed through arm arrangement 900, aperture 609, channel 611, aperture 612, and arm arrangement 1000. FIG. 4a is a depiction of this exemplary embodiment. In some embodiments, cable 710 and cable 1010 may be a single cable. FIG. 4b is a depiction of this exemplary embodiment.

In some embodiments, arm arrangement 1000 may be further comprised of a cylinder 1004. Cylinder 1004 is hollow from a first end 1005 to a second end 1006, and may be of substantially the same diameter as tubular member 1001. In another embodiment, cylinder 1004 may be a shorter length than tubular member 1001. In some embodiments, cylinder 1004 may be substantially the same length as tubular member 1001. In some embodiments, cylinder 1004 may be longer than tubular member 1001. In some embodiments, cylinder 1004 is located at the far end of tubular member 1001. In some embodiments cylinder 1004 is located between hub 600 and tubular member 1001. In some embodiments, the first end may contain a grommet. In some embodiments, the grommet may be a single piece. In some embodiments, the grommet may include an insertable piece and a cap piece. In some embodiments, the first end may have a protective coating. In some embodiments, the first end may have rounded edges. The primary function of cylinder 1004 is to create a joint in arm arrangement 1000. This permits hub 600 to float below the surface of the body of water while decoys float on the surface, disguising the hub and arm arrangement 1000 from the view of passing fowl. The secondary function of cylinder 1004 is to allow the decoy spreader to collapse for transportation and storage. In some embodiments, cable 1010 may be disposed through aperture 604, through the hollow of tubular member 1001, and through the hollow of cylinder 1004, coupling the tubular member and cylinder with hub 600. In some embodiments, cable 1010 may include a protective element between tubular member 1001 and cylinder 1004, as seen in FIG. 6a.

In another embodiment, arm arrangement 1000 may have a connecting member 1007. In some embodiments, connecting member 1007 may be an elastic material. In some embodiments, connecting member 1007 may be a rigid material. In another embodiment, connecting member 1007 is a loop 1008. Loop 1008 may be a single member with a catch 1009 at one end into which the opposite end can be removably inserted to form a closed loop. Loop 1008 may be a wire or any other semi-rigid material that allows the loop to open and close into itself. In some embodiments, connecting member 1007 may be coupled with cable 1010. In some embodiments, cable 1010 is disposed through a loop on connecting member 1007 and then crimped to secure connecting member 1007 to arm arrangement 1000. In some embodiments, connecting member 1007 is coupled with cable 1010 with a cement. In some embodiments, connecting member 1007 is tied to cable 1010 with a knot. In some embodiments, cable 1010 may be a chain, one link of which may be coupled with connecting member 1007 by passing through a loop or by weld. There are many methods by which connecting member 1007 can be coupled with cable 1010 without impacting the function of either member.

The present invention may be comprised of a plurality of arm arrangements of similar configurations disclosed herein. This disclosure should not be construed as limiting the number of arm arrangements to four. The animated decoy spreader may in fact have any number of arm arrangements connected with the hub.

In some embodiments, the decoy spreader may be comprised of hubs 100 and 600, and between one and eight arm arrangements. In one embodiment, hub 100 and hub 600 may each have two arm arrangements, and an arm arrangement of hub 100 may be coupled with an arm arrangement of hub 600. For example, in one embodiment, a first half of the spreader may be comprised of hub 100 and arm arrangements 200 and 500, and a second half of the spreader may be comprised of hub 600 and arm arrangements 800 and 900. In a further embodiment, arm arrangement 200 may be combined with arm arrangement 800 by passing cable 210 and cable 810 through cylinder 204 and coupling both with connecting member 207. In another embodiment, arm arrangements 200 and 800 are complete, and both are simply attached to a single decoy. It should be understood that the chosen arm arrangements are exemplary only, and that any arm arrangements extending from hub 100 and hub 600 may be coupled.

In another exemplary embodiment, arm arrangement 500 may be coupled with arm arrangement 900 with a connector bar 911. See FIG. 8. In some embodiments, connector bar 911 may be of substantially the same length as tubular member 901. In some embodiments, connector bar 911 may be longer than tubular member 901. In some embodiments, connector bar 911 may be shorter than tubular member 901. Connector bar 911 may be any rigid material, such as metal, plastic, wood, etc., without altering the function of connector bar 911. In some embodiments, connector bar 911 may be composed of or more two separable portions of substantially equal length and substantially equal diameter. In some embodiments, these two portions may be joined by a ferrule. In some embodiments, these two portions may be joined by a male-female joint. In some embodiments, these two portions may be joined in any manner by which they are removably coupled, such as threads, snaps, etc., without altering the function of connector bar 911. In some embodiments, connector bar 911 may be used in place of pull cord 115 or 615, such that only one pull cord remains. It should be understood that the chosen arm arrangements are exemplary only, and that any arm arrangements extending from hub 100 and hub 600 may be coupled.

In some embodiments, hub 100 may be coupled with hub 600 with a connector cord 619. See FIG. 9. In some embodiments, connector cord 619 may be an elastic material. In some embodiments, connector cord 619 may be an inelastic material. Connector cord 619 may be any manner of flexible material. In some embodiments, connector cord 619 may be disposed through eyelet 114 and eyelet 614. In some embodiments, connector cord 619 may be used in place of pull cord 115 or 615, such that only one pull cord remains. In some embodiments, hub 100 may have coupled with it arm arrangements 200 through 500. In some embodiments, hub 100 may have fewer than four arm arrangements. In some embodiments, hub 600 may have coupled with it arm arrangements 700 through 1000. In some embodiments, hub 600 may have fewer than four arm arrangements. In some embodiments, hub 600 may have more than four arm arrangements. As stated elsewhere herein, this disclosure should not be construed as limiting the number of arm arrangements.

In an exemplary configuration, hub 100 may be coupled with hub 600 with a connector cord 619. Hub 100 may be coupled with anchor 116 via elastic anchor cord 117, and hub 100 may sit approximately directly above anchor 116. Hub 600 may be coupled with pull cord 615. Hubs 100 and 600 are displaced horizontally via pull cord 615. Because cables 210, 310, 410, 510, 710, 810, 910, and 1010 are flexible, the motion created in the decoys is nearly random. This effect is amplified if the cables are elastic. Moreover, because only one hub is being pulled via the pull cord, the second hub is able move more randomly, adding to the randomness of the motion of the decoys. When the tension on pull cord 615 is released, hubs 100 and 600 return to their original positions, again creating nearly random motion in the decoys and simulating the swimming motion of living water fowl.

In an exemplary embodiment, hub 100 is coupled with arm arrangements 200, 300, 400, and 500. Cables 210, 310, 410, and 510, and anchor cord 117 are elastic members, and anchor cord 117 is coupled with hub 100 and anchor 116. Anchor 116 is placed on the bottom of the body of water, and hub 100 is initially located approximately directly above anchor 116. Hub 100 is displaced horizontally via pull cord 115. Because cables 210, 310, 410, and 510 are elastic, the motion created in the decoys is nearly random. When the tension on pull cord 115 is released, hub 100 returns to a location approximately directly over anchor 116, again creating a nearly random motion in the decoys, simulating living fowl swimming on the surface of the body of water. See FIG. 2. It should be understood that cables 210, 310, 410, and 510 may be inelastic and create a similar effect. It should be understood that hub and arm arrangements chosen for this example can be interchangeable with any other hub or arm arrangement without altering the function of the spreader.

In another exemplary embodiment, hub 100 is coupled with only two arm arrangements, for example arrangements 200 and 400. Anchor 116 is placed on the bottom of the body of water, and it is coupled with hub 100 via the pull cord, which passes through the hub eyelet 114 and anchor eyelet 118, instead of directly to the hub as in the previous example. In this configuration, the hub is displaced vertically, which pulls the arm arrangements further into the water. This simulates the diving motion that water fowl exhibit when they feed. See FIG. 3.

The primary function of connecting hubs 100 and 600 is to create additional random motion in the decoy spreader, allowing for an even more natural simulation of water fowl swimming. In an exemplary embodiment, hub 100 is coupled with arm arrangements 200 through 500, and hub 600 is coupled with arm arrangements 700 through 1000. Cables 210, 310, 410, 510, 710, 810, 910, and 1010 and anchor cord 117 are elastic members. Arm arrangement 200 is coupled with arm arrangement 800 via the decoy. Arm arrangement 500 is coupled with arm arrangement 900 via connector bar 911. See FIG. 8. Hub 100 is coupled with anchor 116 via elastic anchor cord 117, and hub 100 sits approximately directly above anchor 116. Hub 600 is coupled with pull cord 615. Hubs 100 and 600 are displaced horizontally via pull cord 615. Because cables 210, 310, 410, 510, 710, 810, 910, and 1010 are flexible, the motion created in the decoys is nearly random. This effect is amplified if the cables are elastic. Moreover, because only one hub is being pulled via the pull cord, the second hub is able move more randomly, adding to the randomness of the motion of the decoys. When the tension on pull cord 615 is released, hubs 100 and 600 return to their original positions, again creating nearly random motion in the decoys and simulating the swimming motion of living water fowl. It should be understood that either hub 100 or 600 could be connected to the anchor, that either anchor 116 or 616 could be used, and that either pull cord 115 or 615 could be used. It should also be understood that the arm arrangements from each hub coupled together could be any number of arrangements, given that the arm arrangements coupled via the decoy are proximate to the arm arrangements coupled by the connector bar.

In some embodiments, hubs 100 and 600 may be coupled with additional hubs, each additional hub having a plurality of arm arrangements. Each set of hub and arm arrangements adds to the randomness of the motion of the decoys, and this disclosure should not be construed as limiting the number of hubs to be coupled to complete an array.

In general, it should be noted that hubs 100 and 600 are interchangeable, and that any of the arm arrangements are interchangeable with one another. Numbering in the figures and this specification is for illustration only.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

While preferred and alternative embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A decoy spreader, comprising:
   at least a first hub and a second hub, the hubs each including at least one aperture;
   at least a first arm arrangement coupled with the first hub, including at least:
      a tubular member, the tubular member including at least a far end and a hub end, the hub end removably received by the at least one aperture of the hub, the tubular member being hollow from the far end to the hub end; and
      a connecting member, the connecting member located at the far end of the tubular member;
   at least a second arm arrangement, the second arm arrangement configured like the first arm arrangement and coupled with the second hub;
   a first cable, the first cable coupled with the connecting member of the first arm arrangement and disposed through the hollow of the first arm arrangement and the at least one aperture of the first hub;
   a second cable, the second cable coupled with the connecting member of the second arm arrangement and disposed through the hollow of the second arm arrangement and the at least one aperture of the second hub; and
   a connector bar, the connector bar coupled to the far end of the first arm arrangement and the far end of the second arm arrangement.

2. The decoy spreader of claim 1, wherein the first arm arrangement further comprises:
   a cylinder, the cylinder having a shorter length than the tubular member and being hollow from a first end of the cylinder to a second end of the cylinder
   wherein the cord is coupled with the connecting member and then disposed through the hollow of the cylinder, the hollow of the tubular member, and the at least one aperture of the hub.

3. The decoy spreader of claim 1, wherein the tubular member is further comprised of:
   a first portion and a second portion, wherein the first portion and the second portion are of substantially equal length; and
   a ferrule, the ferrule disposed at the far end of the first portion and the hub end of the second portion.

4. The decoy spreader of claim 3, wherein the ferrule is disposed at the far end of the first portion and the hub end of the second portion of the tubular member such that the two portions of the tubular member can be removably coupled.

5. The decoy spreader of claim 1, wherein the connecting member further comprises:
   a wire, at one end of which is a catch into which the other end is inserted to form a closed loop; and
   an eyelet, wherein the cord is disposed through the eyelet.

6. The decoy spreader of claim 1, wherein the first hub and the second hub, wherein the hubs further comprise:

a disk, including at least a top surface, a bottom surface, and an edge defining a cylindrical shape, the edge including the at least one aperture.

7. The decoy spreader of claim 1, wherein the first hub and the second hub, wherein the hubs further comprise:
a channel with a first end on a first side of the hub and a second end on a second side of the hub.

8. The decoy spreader of claim 6, further comprising:
each hub including at least a first channel and a second channel, and a cable, wherein the cable is coupled with the connecting member of the first arm arrangement, then disposed through the hollow of the first arm arrangement, the first channel, the hollow of the second arm arrangement, and coupled with the connecting member of the second arm arrangement.

9. The decoy spreader of claim 1, wherein the cable is elastic.

10. The decoy spreader of claim 1, further comprising:
an anchor; and
a cord coupling the anchor with at least one of the first hub or the second hub.

11. The decoy spreader of claim 10, wherein the cord coupling the anchor with at least one of the first hub or the second hub comprises:
an inelastic anchor cord disposed through a loop on the anchor and through a loop on a surface of at least one of the first hub or the second hub.

12. The decoy spreader of claim 10, wherein the cord coupling the anchor with at least one of the first hub or the second hub is further disposed through a handle.

13. The decoy spreader of claim 10, wherein the cord coupling the anchor with at least one of the first hub or the second hub comprises:
an elastic anchor cord disposed through a loop on the anchor and through a loop on a surface of at least one of the first hub or the second hub.

14. The decoy spreader of claim 13, wherein the cord coupling the anchor with the hub is further disposed through a handle.

15. The decoy spreader of claim 1, wherein the cable coupling the connecting member of the first arm arrangement and the connecting member of the second arm arrangement is elastic.

16. The decoy spreader of claim 1, wherein the cable coupling the connecting member of the first arm arrangement and the connecting member of the second arm arrangement is further comprised of:
a first segment disposed through the first arm arrangement and coupled with the hub; and
a second segment disposed through the second arm arrangement and coupled with the hub.

* * * * *